United States Patent [19]

Lilienthal

[11] Patent Number: 4,593,764
[45] Date of Patent: Jun. 10, 1986

[54] REMOVAL OF PIPE DOPE CONSTRICTIONS

[75] Inventor: Walter B. Lilienthal, Houston, Tex.

[73] Assignee: Conoco Inc., Ponca City, Okla.

[21] Appl. No.: 669,281

[22] Filed: Nov. 8, 1984

[51] Int. Cl.$^4$ .............................................. E21B 37/00
[52] U.S. Cl. ................................ 166/312; 166/305.1; 134/22.1; 134/22.11
[58] Field of Search ................... 166/304, 365 R, 306, 166/279, 312; 134/22.1, 22.11, 22.14, 31, 40

[56] References Cited

U.S. PATENT DOCUMENTS

| | | |
|---|---|---|
| 2,225,434 | 12/1940 | Harrigan . |
| 2,512,801 | 6/1950 | Kinney et al. ................... 166/312 X |
| 3,154,087 | 12/1961 | Beaver . |
| 3,156,584 | 11/1964 | Yurdin . |
| 3,573,213 | 3/1971 | Burt . |
| 3,607,767 | 9/1971 | Schofield . |
| 3,728,268 | 4/1973 | Burt . |
| 3,789,006 | 1/1974 | McMillan et al. . |
| 4,039,465 | 8/1977 | Hutchinson et al. ............. 134/40 X |
| 4,279,664 | 7/1981 | Figiel et al. . |
| 4,484,625 | 11/1984 | Barbee, Jr. ....................... 166/312 X |

FOREIGN PATENT DOCUMENTS 467208  7/1937  United Kingdom .

OTHER PUBLICATIONS

API Bulletin 5A2, Fifth Edition, Apr. 1972.

*Primary Examiner*—Stephen J. Novosad
*Assistant Examiner*—Thomas J. Odar
*Attorney, Agent, or Firm*—A. Joe Reinert

[57] ABSTRACT

Pipe dope restricting fluid communication between a well bore and a subterranean formation is contacted with a liquid perhaloalkane having no more than three carbon atoms per molecule, such as 1,1,2-trichloro-1,2,2-trifluoroethane, to improve fluid communication. The halocarbon can also be contacted with pipe dope on tubulars to remove the pipe dope from the tubulars.

8 Claims, No Drawings

REMOVAL OF PIPE DOPE CONSTRICTIONS

BACKGROUND OF THE INVENTION

1. Field of the Invention

The invention relates to recovery of oil. In one aspect, the invention relates to improvement of fluid communication between a well bore and an oil containing subterranean formation by removal of pipe dope constrictions. In another aspect, the invention relates to removal of pipe dope from tubulars.

2. Brief Description of the Prior Art

Pipe dopes are employed for casing and tubing connections in high pressure well service. These materials, also known as thread compounds, are described and defined in API Bulletin 5A2, Fifth Edition, April 1972. The compounds were originally developed by the Mellon Institute of Industrial Research, under an API-sponsored research project, to meet the following objectives:

(1) Adequate lubricating qualities to prevent galling in threaded connections during make-up.

(2) No tendency to disentegrate nor undergo radical change in volume at temperatures up to 300° F.

(3) No tendency to become excessively fluid at temperatures as high as 300° F.

(4) Sealing properties sufficient to prevent leakage at temperatures as high as 300° F.

(5) Absence of any deleterious instability and of any drier or hardener that will evaporate or oxidize, thereby changing the thread-compound properties.

(6) Resistance to water absorption.

(7) Sufficient inert filler to prevent leakage of API round-thread casing and tubing joints under pressure as high as 10,000 psi.

(8) Readily applicable by brush to pipe joints in cold weather.

The term "pipe dope", as employed herein, means the compounds designated in Section 1 of API Bulletin 5A2. A quotation from Section 1 of API Bulletin 5A2 follows:

SECTION 1

Compound Compositions

1. Compounds. The compounds shall be designated as the "silicone thread compound" and the "modified thread compound." They shall be a mixture of metallic and graphitic powders uniformly dispersed in a grease base. Proportions of solids and grease base shall be as listed in Table 1.

TABLE 1

PROPORTIONS OF SOLIDS AND GREASE BASE

| Component | Percent By Weight |
|---|---|
| Total solids | 64.0 ± 2.5 |
| Grease base | 36.0 ± 2.5 |
| Total | 100.0 |

2. Composition of Solids. The solids shall be a mixture of powdered graphite, lead powder, zinc dust, and copper flake in the proportions listed in Table 2 and as specified in Par. 7, 8, 9 and 10.

TABLE 2

PROPORTIONS OF SOLIDS

| | Percent by Weight | |
|---|---|---|
| Constituent | Total Solids | Compound |
| Powdered graphite | 28.0 | 18.0 ± 1.0 |
| Lead powder | 47.5 | 30.5 ± 0.6 |
| Zinc dust | 19.3 | 12.2 ± 0.6 |
| Copper flake | 5.2 | 3.3 ± 0.3 |
| Total | 100.0 | 64.0 |

3. Grease Bases. Grease base for the modified thread compound shall be a grease which, when combined with the powdered metals and graphite, will comply with the control and performance test requirements listed in Table 4. Grease base for the silicone thread compound shall consist of a grease plus two types of silicones as shown in Table 3 and as specified in Par. 5 and 6, which, when combined with the powdered solids, will comply with the control and performance test requirements listed in Table 4.

TABLE 3

GREASE BASE FOR SILICONE THREAD COMPOUND

| | Percent by Weight | |
|---|---|---|
| Constituent | Grease Base | Compound |
| Grease | 57.2 | 20.5 ± 0.5 |
| Silicone compound | 35.6 | 12.9 ± 0.3 |
| Silicone fluid | 7.2 | 2.6 ± 0.2 |
| Total | 100.0 | 36.0 |

The API Bulletin is herewith incorporated by reference for purposes of disclosure, and those skilled in the art are directed thereto for a more complete disclosure relating to pipe dopes.

Concisely, pipe dopes, as the term is used herein, are comprised of grease, silicone compound, powdered graphite, lead powder, zinc dust, and optionally copper flake, within the above specified ranges.

Such pipe dopes are widely used in the petroleum industry in the drilling of bore holes and in the completion of production wells.

To a greater or lessor degree, depending largely upon the degree of care exercised by drilling and completion crews, such pipe dope finds its way into passageways for fluid communication between the well bore and the oil producing subterranean formation. This may to a very substantial degree interfere with fluid communication and on occasion greatly inhibit production. Also, if the well is being used as an injection well for an enhanced oil recovery process, the deterioration of fluid communication may greatly inhibit injectivity.

When such deterioration of fluid communication occurs, a method for re-establishing full fluid communication between the well bore and the subterranean formation is of considerable value. The process of this invention provides such benefits.

The applicant has made a limited pre-examination search as relating to the invention. A prior art reference having relevance is U.S. Pat. No. 3,573,213 which relates to use of an azeotrope of 1,1,2-trichloro-1,2,2-trifluoroethane and nitromethane as a degreasing composition. Also of relevance is Brit. 467,208 disclosing use of halogenated hydrocarbons as solvents. Particularly, U.S. Pat. No. 3,573,213 discloses that 1,1,2-trichloro-1,2,2-trifluoroethane dissolves grease and attacks zinc.

However, the foregong disclosure is not believed to anticipate or render the instant invention obvious since liquid hydrocarbons in general, such as those found in an oil well, also dissolve grease, and yet the plugging problem caused by pipe dope exists. As hetetofore pointed out, pipe dope is not grease per se, nor exposed zinc per se, but rather is a complex mixture containing a number of other materials including silicones.

Other related disclosures include U.S. Pat. No. 2,225,434 which discloses using organic solvents such as trichloroethylene and perchloroethylene to dissolve paraffins. U.S. Pat. No. 3,156,584 discloses any "Freon 12" or "Freon 22" to remove sludge constrictions in pipe. U.S. Pat. No. 3,607,767 discloses that trichlorotrifluoroethane is a solvent for greases, oils, waxes, and the like. Applicant's searcher also cited U.S. Pat. No. 3,154,087; U.S. Pat. No. 3,789,006; U.S. Pat. No. 3,728,268; and U.S. Pat. No. 4,279,664 which show use of halogenated hydrocarbons such as trichlorotrifluoroethane in combination with various other materials as degreasing agents or solvents for various applications, or which are otherwise exemplary of the state of the art.

OBJECTS OF THE INVENTION

An object of the invention is to provide a process for removing pipe dope restriction from communicating passageways between a well bore and a subterranean formation. In another aspect, the invention provides a process for removal of pipe dope from tubulars.

SUMMARY OF THE INVENTION

Pipe dope restrictions of passageways between a subterranean formation and a well bore are removed by contacting the restriction with an effective amount of a liquid perhaloalkane having no more than three carbon atoms per molecule. In a specific aspect, the zone containing a restriction is flushed with a liquid having an effective amount of a perhaloalkane that is perhalogenated with chlorine and fluorine, presently, preferably 1,1,2-trichloro-1,2,2-fluoroethane.

PREFERRED EMBODIMENTS OF THE INVENTION AND EXAMPLES

In accordance with a presently preferred embodiment of the invention, a well bore having constriction of passageways between the well bore and a subterranean formation of interest, particularly an oil producing subterranean formation, is treated by contacting the pipe dope in the constricted zone with an effective amount of a liquid perhaloalkane having no more than three carbon atoms per molecule.

The perhaloalkane is brought into contact with the pipe dope in the constricted zone by methods which are well known to those skilled in the art of oil production. In accordance with one presently preferred embodiment, a slug of a liquid containing the perhaloalkane is injected down the well bore into the formation, and then produced out of the well bore. It is often advantageous to calculate the size of the effective slug and following slugs of liquid as well as calculating the timing so that the liquid perhaloalkane remains in contact with the pipe dope in the constricted zone for an amount of time sufficient or more than sufficient to effect dissolution of the constrictions. The liquid containing the perhaloalkane can be introduced to the zone of constriction by means of a tubing string.

Optimization of the process is readily calculated by those skilled in the art or readily determinable by experiments not amounting to invention.

Some examples of liquid perhaloalkanes having no more than three carbon atoms per molecule include the following: 1,1-2-trichloro-1,2,2-trifluoroethane, 1,1,2,2-tetrachloro-1,2-difluoroethane, 1,1,1-trichloro-2,2,2-trifluoroethane.

A presently preferred material is 1,1,2-trichloro-1,2,2-trifluoroethane because of excellent performance and because of ready commercial availability. For example, "FREON TF", or trichlorotrifluoroethane, is available from E. I. DuPont De Nemours and Company, as is "FREON$_3$TMC" a mixture of methylene chloride and "FREON TF"; "FREON TA", the azeotrope of "FREON TF" and acetone; and "FREON TMS" the azeotrope of "FREON TF" and methanol with added nitromethane. Such products are widely available on the market and are widely used in vapor degreasing and cold cleaning processes.

Properties of these products that make them very desirable as vapor degreasers and in cold cleaning processes are also desirable in accordance with the process of this application. They are nonflamable, stable at elevated temperatures, relatively nonreactive with other chemical species, and have high density and low toxicity.

The process of this invention involves the use of a liquid perhaloalkane. The term "liquid" means liquid in the environment of contact with the pipe dope. For example, in the embodiment wherein constrictions to fluid communication between a well bore and a subterranean formation by pipe dope are removed, the term "liquid" means liquid at the locus of the constricting pipe dope. That is, the perchloroalkane will need to be liquid at the temperatures and pressures at that locus.

The presently preferred 1,1,2-trichloro-1,2,2-trifluoroethane is liquid at a range of temperatures and pressures sufficient for treatment of most wells and formations.

The pipe dope is contacted with a liquid comprising an effective amount of the liquid perhaloalkane. The liquid can also contain other liquids that are soluble with or emulsible with the perhaloalkane such as methylenechloride, acetone, nitromethane, other halogenated hydrocarbons, and the like. Suitable carriers for or mixtures of the perhaloalkane can be determined by those skilled in the art for a particular application by simple experiment not amounting to invention.

A number of known techniques can be employed to deliver the effective amount of the perhaloalkane to the site of constriction. For example, the material can be sandwiched between two wiper plugs and injected down the well bore behind a preslug and followed by a pusher-slug of a suitable fluid. Because of the density of the presently preferred 1,1,2-trichloro-1,2,2-trifluoroethane, in many circumstances, it will also be advantageous to simply let the perhaloalkane sink through a column of liquid that is immiscible with the perhaloalkane and of less density than the perhaloalkane. The perhaloalkane containing liquid can also be introduced to the zone of interest by means of a tubing string or a small diameter tubing.

In the embodiment wherein the perhaloalkane is employed to remove pipe dope from tubulars, it can be brushed on the tubulars, sprayed on the tubulars, or the like. Recycling can be employed. After dispersal of the pipe dope by the perhaloalkane, the site can be brushed or wiped clean.

By way of exemplification, 1,1,2-trichloro-1,2,2-trifluoroethane is brushed on the ends of tubulars that are heavily loaded with pipe dope. The pipe dope is rapidly and readily removed by the procedure.

The foregoing examples and description of preferred modes are provided in order to more fully explain the invention and provide information to those skilled in the art on how to carry it out. However, it is to be understood that these examples and description are not intended to function as limitations on the invention as described and claimed in the entirety of this application.

I claim:

1. A process for removing pipe dope restriction of fluid communication between a subterranean formation and a well bore comprising:

contacting the pipe dope with an effective amount of a liquid perhaloalkane having no more than three carbon atoms per molecule.

2. The process of claim 1 wherein the perhaloalkane is perhalogenated with Cl and F.

3. The process of claim 2 wherein the perhaloalkane is 1,1,2-trichloro-1,2,2-trifluoroethane.

4. The process of claim 1 wherein a slug of a liquid comprising the perhaloalkane is injected down a well bore into an oil production horizon after drilling and completion of the well bore is effected.

5. The process of claim 4 wherein the perhaloalkane is 1,1,2-trichloro-1,2,2-trifluoroethane.

6. A process for cleaning pipe dope from tubulars comprising applying an effective amount of a liquid comprising a liquid perhaloalkane having no more than three carbon atoms per molecule and then removing the liquid comprising the perhaloalkane and pipe dope from the tubular.

7. The process of claim 6 wherein the perhaloalkane is perhalogenated with chlorine and fluorine and has two carbon atoms per molecule.

8. The process of claim 7 wherein the perhaloalkane is 1,1,2-trichloro-1,2,2-trifluoroethane.

* * * * *